(12) United States Patent
Yamamiya

(10) Patent No.: US 7,172,116 B2
(45) Date of Patent: Feb. 6, 2007

(54) AUTOMATIC DISPENSING MACHINE OF CARDS AND CARD LIKE GOODS

(75) Inventor: Takahito Yamamiya, Iwatsuki (JP)

(73) Assignee: Asahi Seiko Kabushiki Kaisha (JP)

( * ) Notice: Subject to any disclaimer, the term of this patent is extended or adjusted under 35 U.S.C. 154(b) by 159 days.

(21) Appl. No.: 10/994,970

(22) Filed: Nov. 22, 2004

(65) Prior Publication Data
US 2005/0133592 A1 Jun. 23, 2005

(30) Foreign Application Priority Data
Dec. 19, 2003 (JP) .............................. 2003-423847

(51) Int. Cl.
G06F 7/08 (2006.01)
G06F 5/00 (2006.01)
B65H 5/08 (2006.01)
B65H 3/34 (2006.01)
B65H 3/62 (2006.01)

(52) U.S. Cl. ................... 235/381; 235/380; 271/11; 271/104; 271/146; 221/10; 221/211

(58) Field of Classification Search ............... 235/380, 235/381; 271/11, 104, 146
See application file for complete search history.

(56) References Cited

U.S. PATENT DOCUMENTS

| | | | | |
|---|---|---|---|---|
| 3,854,714 A | * | 12/1974 | Hatanaka et al. ............ 271/12 |
| 3,937,453 A | * | 2/1976 | Hickey et al. ............ 271/4.09 |
| 4,452,031 A | * | 6/1984 | Dennis et al. ................ 53/586 |
| 4,513,957 A | * | 4/1985 | Schaefer, Jr. ................ 271/90 |
| 4,627,605 A | * | 12/1986 | Roller et al. ................. 271/94 |
| 4,787,533 A | * | 11/1988 | Haroutel et al. ............. 221/12 |
| 4,993,587 A | * | 2/1991 | Abe ............................ 221/21 |
| 5,193,794 A | * | 3/1993 | Steinhilber ................ 271/9.07 |
| 5,542,571 A | * | 8/1996 | Belka ......................... 221/268 |
| 5,556,252 A | * | 9/1996 | Kuster ..................... 414/796.7 |
| 5,857,588 A | * | 1/1999 | Kasper ...................... 221/274 |
| 5,971,205 A | * | 10/1999 | Michaels et al. ........... 221/135 |
| 6,050,448 A | * | 4/2000 | Willis ......................... 221/197 |
| 6,082,728 A | * | 7/2000 | Ubayashi .................... 271/108 |

(Continued)

FOREIGN PATENT DOCUMENTS

JP  2003-261236  9/2003

(Continued)

Primary Examiner—Daniel Walsh
(74) Attorney, Agent, or Firm—McGlew & Tuttle, PC

(57) ABSTRACT

Dispensing more than one card or card like good is prevented to prevent issuing a duplicate with an automatic dispensing machine of card or card like good having a table which supports the piled up card or card like good. A sucking device is located over the table and pulls the card or card like good. A transporting device transports the card or card like good which is pulled by the sucking device. A moving device drives to change the distance between the table and the sucking device. A duplicate detecting device is located at a card transporting passageway which is located downstream the transporting device. A vibrator imparts a vibration to the card or card like good on the table. A separating device acts when the duplicate detecting device detects the duplicate of the goods. The separating device and the transporting device reverses, and the goods of card like is returned on the table. Afterwards the sucking device is stopped, then the vibrator is vibrated.

5 Claims, 10 Drawing Sheets

U.S. PATENT DOCUMENTS

| | | |
|---|---|---|
| 6,102,248 A | 8/2000 | Yamamiya |
| 6,267,370 B1 * | 7/2001 | Ito et al. .................... 271/138 |
| 6,311,867 B1 | 11/2001 | Yamamiya |
| 2003/0126970 A1 * | 7/2003 | Kansaku et al. .............. 83/879 |
| 2003/0197323 A1 | 10/2003 | Yamamiya et al. |

FOREIGN PATENT DOCUMENTS

| | | |
|---|---|---|
| JP | 2003261236 | 9/2003 |

* cited by examiner

AUTOMATIC DISPENSING MACHINE OF CARDS AND CARD LIKE GOODS

CROSS REFERENCE TO RELATED APPLICATIONS

This application claims the benefit of priority under 35 U.S.C. § 119 of Japan Application No. 2003-423847 filed Dec. 19, 2003, the entire contents of which are incorporated herein by reference.

FIELD OF THE INVENTION

This invention is related generally to a device for automatically dispensing a card or card like good one by one and a method for such automatically dispensing and more particularly to a device or a method which automatically dispenses the card or card like good which is enclosed in a section like sheet which is made of a thin film.

In this specification, "card or card like good" is card or a card which is enclosed in a bag or only a card. The term "bag like sheet" is a reference to a sheet made from resin, aluminum film, paper or etc, which is in some cases airproof though however in some cases it does allow a small amount of air to penetrate. The term "card" includes telephone cards, pre-paid cards, character cards, bromides and IC cards etc.

BACKGROUND OF THE INVENTION

The applicant of the present invention proposed an apparatus where the accumulated card or card like good are not scratched and are dispensed one by one. In the apparatus, the piled up card or card like good on a table is pulled, afterwards the table goes downwards. Therefore the uppermost card or card like good is only pulled, afterwards the pulled card is dispensed by a transporting unit as disclosed in JP2003-261236 (FIGS. 1–6, Pages 4–6)

In this prior art, the card or card like good is on rare occasions dispensed in duplicate. This inventor made sure the cause which is explained in detail as follows. When there is condensed dew from high humidity and this is evaporated between the card or card like good, the impurities have an adhering function. Accordingly, the lower card or card like good adheres to the uppermost card or card like good. This is just as if the card or card like good are adhered by an adhesive.

SUMMARY OF THE INVENTION

The first object of this invention is to prevent the over dispensing of the card or card like good. The second object of this invention is to prevent the duplication and the dispensing of the card or card like good in a simple manner. The third object of this invention is to provide an inexpensive device which can prevent the over dispensing of the card or card like good.

According to the invention to provide a solution of the problem, an automatic dispensing machine of card or card like good is provided. The machine includes a table which supports the piled up card or card like good. A sucking device is located over the table and pulls the card or card like good. A transporting device transports the card or card like good which is pulled by the sucking device. A moving device drives to change the distance between the table and the sucking device. A duplicate detecting device is located at a card transporting passageway which is located downstream the transporting device. A vibrator is provided which imparts a vibration to the card or card like good on the table. A separating device is provided. When the duplicate detecting device detects the duplicate of the goods, the separating device and the transporting device reverse. The card or card like good is returned on the table, afterwards the sucking device is stopped, then the vibrator is vibrated.

In the machine of the invention, when a dispensing signal is output, the card or card like good is pulled by the sucking device, and it is dispensed by the transporting device. In this process, when the card or card like good is duplicate, it is detected by the duplicate detecting device. The separating device operates. By this, the card or card like good is returned over the table by the transporting device. Afterwards the sucking device is stopped, and the card or card like good falls down on the table. Afterwards the fallen card or card like good is vibrated by the vibrator. As above-mentioned, the adhesive force is very little. Accordingly, the adhered card or card like good is separated by the vibration. Afterwards the sucking device and the transporting device are operated. By this, the uppermost card or card like good is pulled and is transported. As a result, when duplicated cards or card like goods are dispensed, the cards or card like goods are automatically separated, afterwards only one of the separated cards or card like goods is dispensed again.

According to another aspect of the invention the transporting device includes a pair of pinching rollers which is located between the sucking device and the duplicate detecting device. In this component, the dispensed duplicated card or card like goods are pinched between a pair of pinching rollers. In this pinched situation, the upper card or card like good and the lower card or card like good are in contact with different rollers. Accordingly the upper card or card like good and the lower card or card like good move at different speeds. Also, when the adhered section between the upper card or card like good and the lower card or card like good is pinched, sometimes the adhered section moves as to its position. The adhered section receives a shearing force based on the different speeds or it moves its position. In other words, the adhered cards or card like goods are separated by a pair of pinching rollers which join in the vibration. As a result, the duplicated dispensing is cancelled.

According to another aspect of the invention the automatic dispensing method of dispensing a card or card like good comprises a pulling step where the piled up card or card like good is pulled up by sucking device, a transporting step where the pulled up card or card like good is transported by a transporting device, a duplicate detecting step where the duplicated card or card like good are detected by the duplicate detecting device in the transporting process. A returning step is provided where the cards or card like goods are returned to a position which is located over the table by the transporting device based on a detected duplicate set of cards or card like goods. Afterwards a stopping step where the sucking device stops is followed by a vibrating step for imparting a vibration to the cards or card like goods on the table using the vibrating device. Afterwards a sucking step is provided for pulling by the sucking device, and a transporting step is provided where the sucked good is transported by the transporting device.

In this method, when operating in the dispensing direction, the uppermost card or card like good on the table is pulled up by the sucking device. Afterwards the pulled card or card like good is transported by the transporting device. When the card or card like good is duplicated, it is detected by the duplicate detecting device. The duplicated cards or card like goods are returned over the table based on the detecting. Afterwards the sucking device is stopped, the duplicate cards or card like goods fall down onto the table. Afterwards the vibrating device is operated. Accordingly, the cards or card like goods are vibrated. The adhered cards or card like goods receive the vibration. The adhering force is very small as above-mentioned. As a result, the adhered card or card like good is separated by the vibration. Afterwards the sucking device and the transporting device is operated. Therefore the uppermost card or card like good is pulled, and transported. In brief, when the duplicate card or card like good is dispensed, the duplicated card or card like good is separated automatically, afterwards only one card or card like good is dispensed.

An automatic dispensing machine of card or card like good comprises a table which supports the piled up cards or card like goods, a sucking device which is located over the table and pulls the card or card like good, a transporting device which transports the card or card like good which is pulled by the sucking device, a moving device which drives to change the distance between the table and the sucking device, a duplicate detecting device which is located at card transporting passageway which is located downstream at the transporting device, a vibrator which gives the vibration to the card or card like good on the table, a separating device. When the duplicate detecting device detects the duplicate of the goods, the separating device and the transporting device reverse. The card or cards like goods are returned on the table, afterwards the sucking device is stopped, then the vibrator is vibrated.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
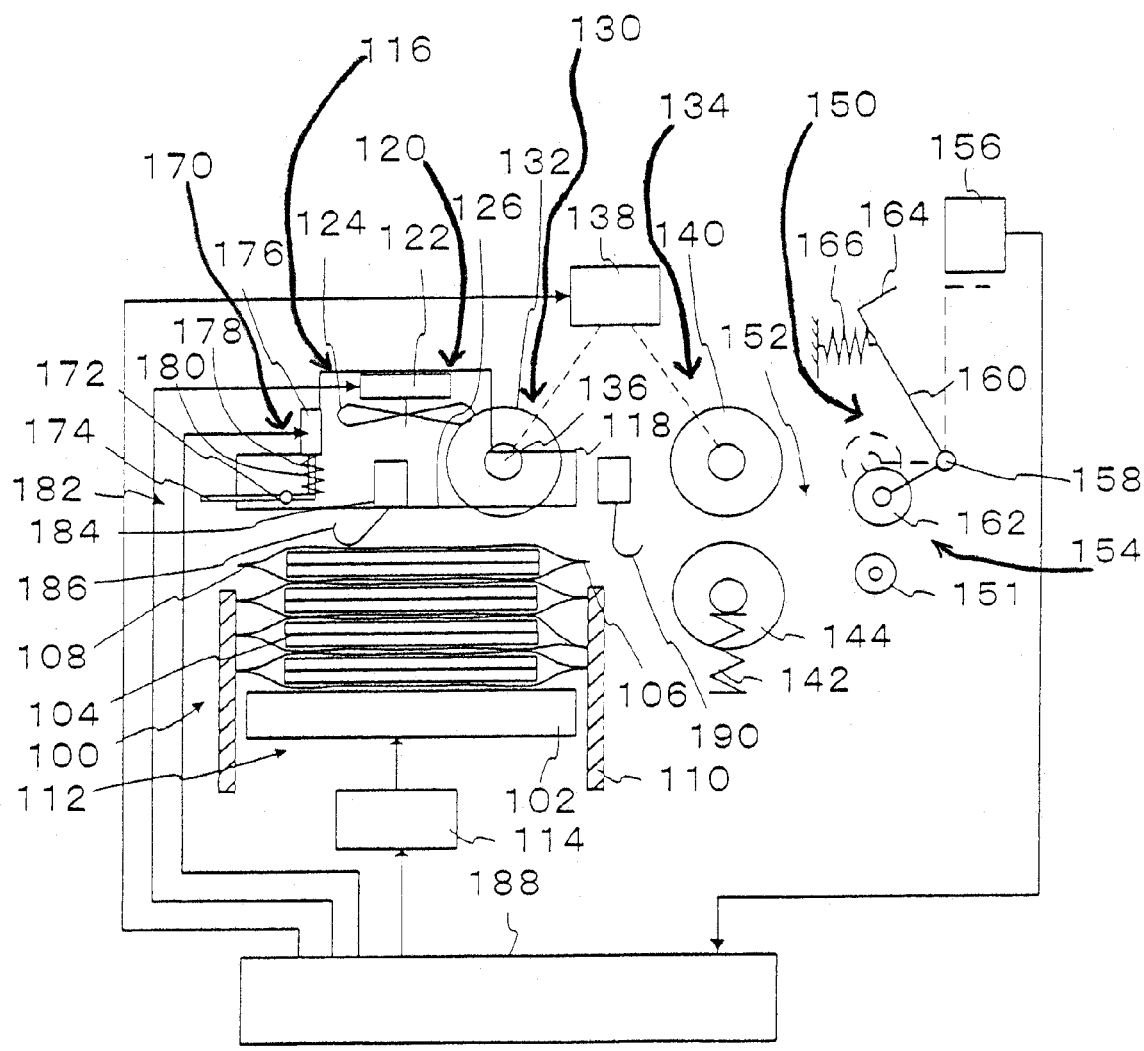
FIG. 1 is a schematic view of the automatic dispensing machine of the card or card like good of an embodiment according to the invention.
Figure 2:
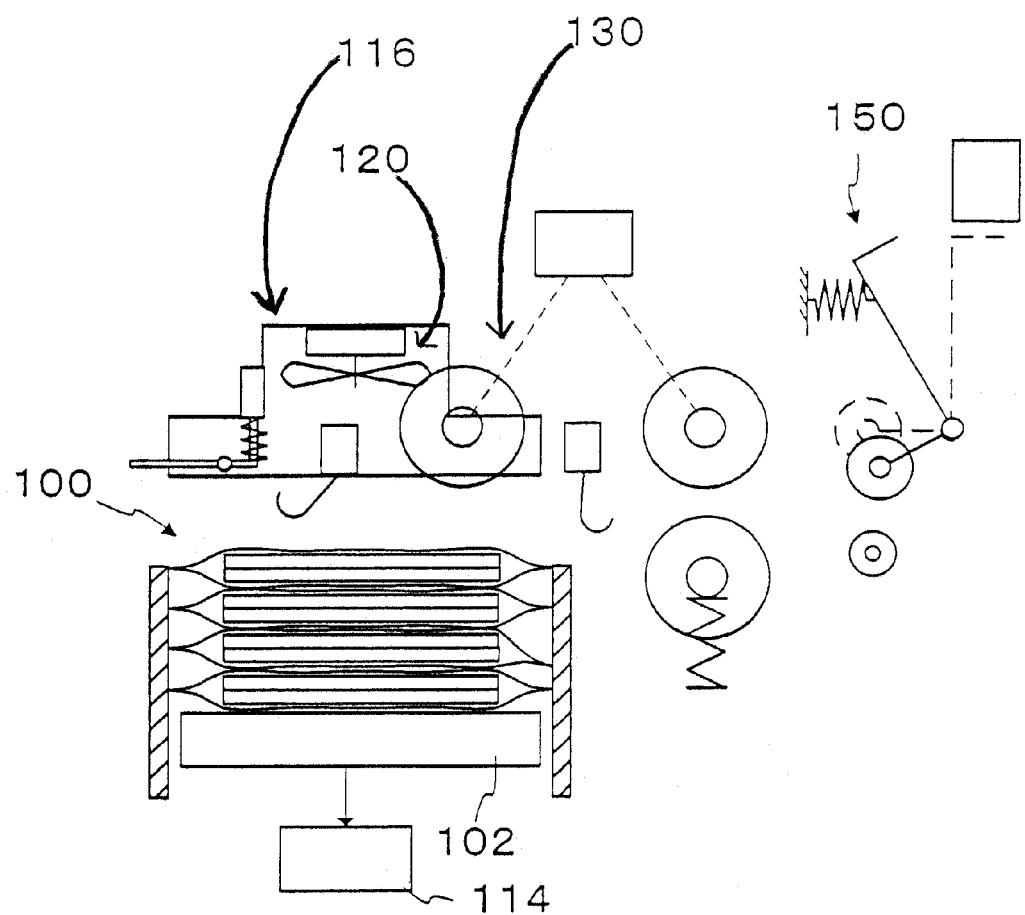
FIG. 2 is an explanatory schematic view of the automatic dispensing machine of the card or card like good of the embodiment according to FIG. 1.
Figure 3:
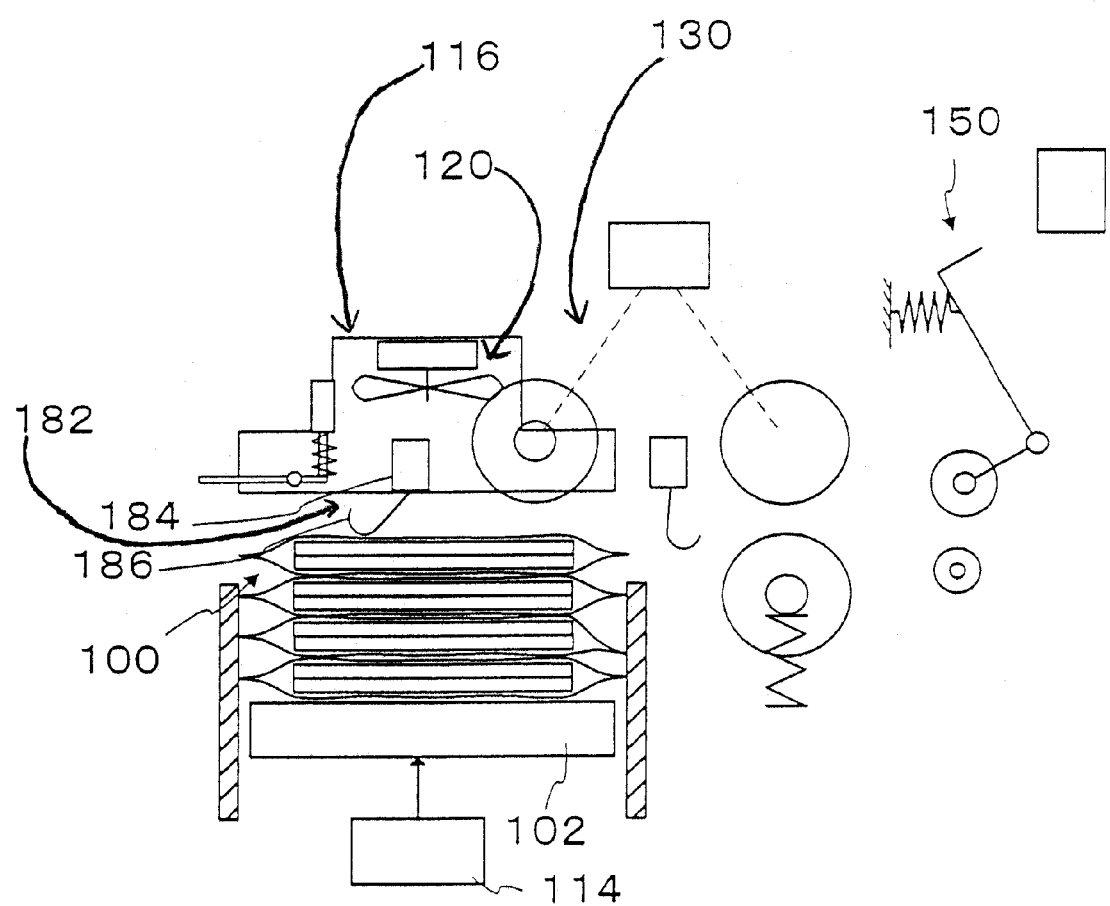
FIG. 3 is an explanatory schematic view of the automatic dispensing machine of the card or card like good of the embodiment according to FIG. 1.
Figure 4:
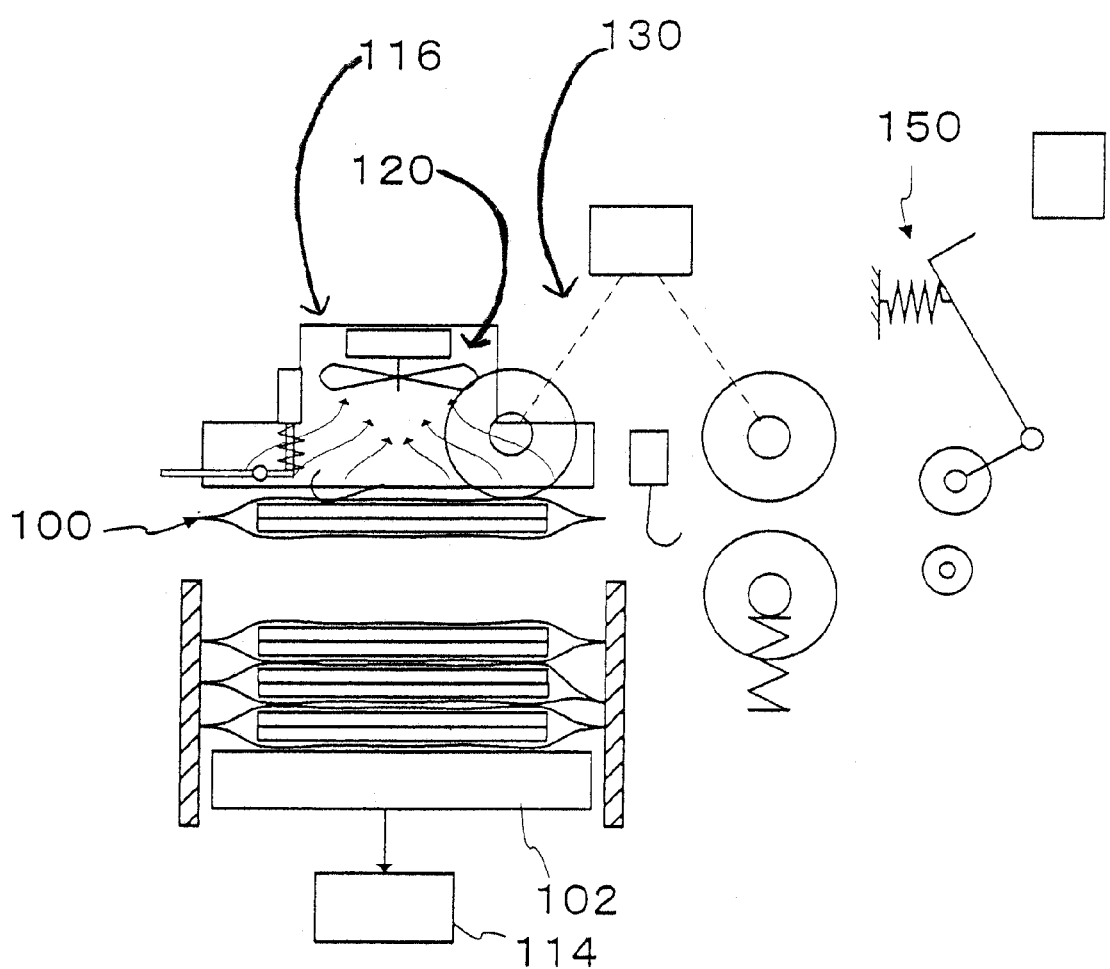
FIG. 4 is an explanatory schematic view of the automatic dispensing machine of the card or card like good of the embodiment according to FIG. 1.
Figure 10:
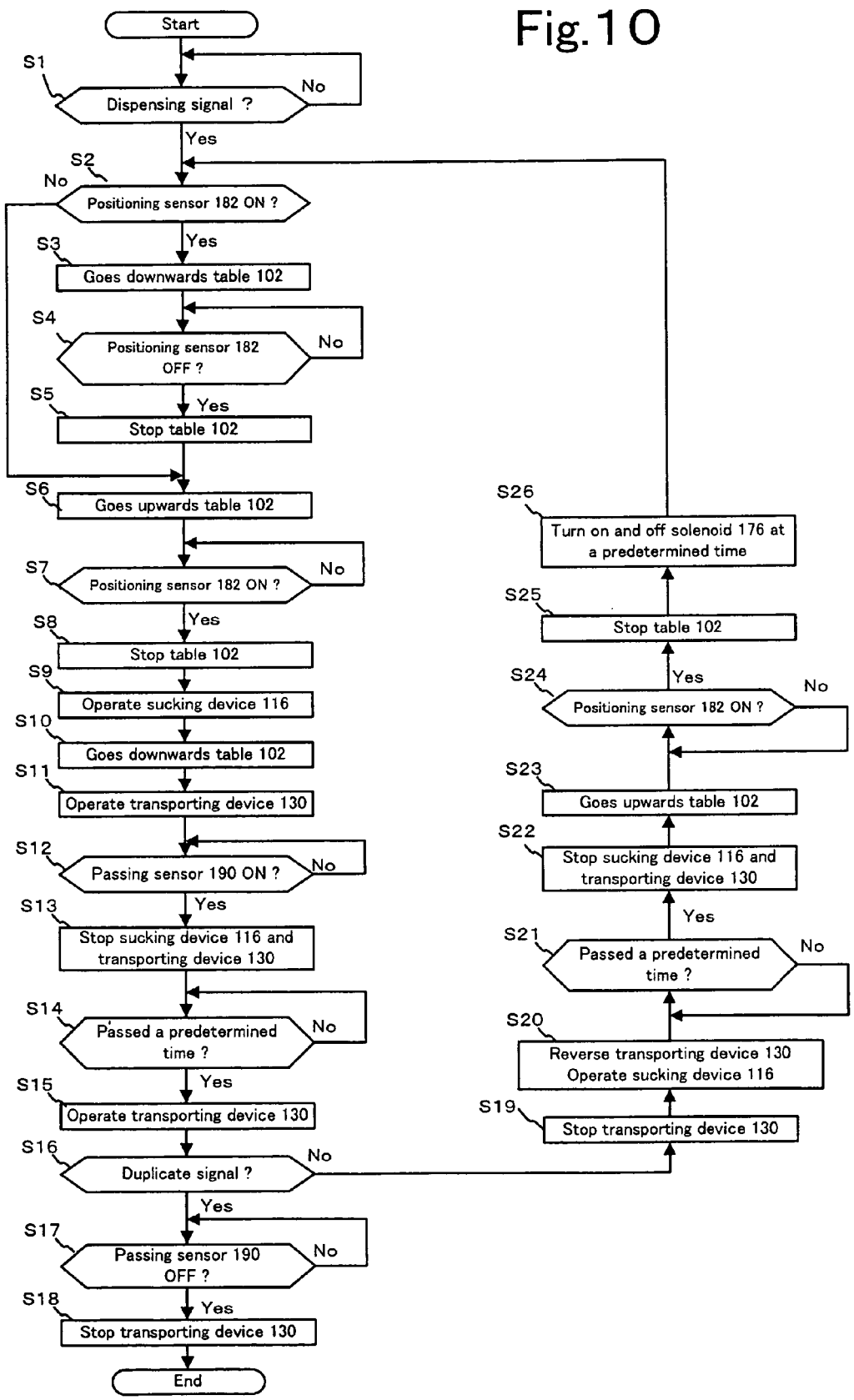
FIG. 10 is a flow chart to explain the operation of the embodiment according to FIG. 1.

Referring to the drawings in particular, FIG. 1 shows the automatic dispensing machine of the card or card like good of a preferred embodiment according to the invention schematically. FIGS. 2–9 present views similar to FIG. 1 explaining the automatic dispensing machine of the card or card like good of the preferred embodiment. FIG. 10 shows the operation of the embodiment as a flow diagram.

In FIG. 1, the card or card like good 100 is piled up on the table 102. In this embodiment, the card or card like good 100 is a bag which encloses two cards 104. In other words, top end 106 and rear end 108 are thinner than the middle section which is located at the cards, because there are no cards at both of the ends. Firstly table 102 is explained. Table 102 is moved up and down by moving device 114 in the storing section 112. The storing section 112 is rectangular in shape and is enclosed by card case 110 on all side. Moving device 114 has a function where the table 102 is moved up and down. Therefore the moving device 114 can be changed to or replaced by another device which has the same function.

Next sucking device 116 is explained. The suction device or sucking device 116 is located over the table 102. Sucking device 116 has a function that pulls the card or card like good 100 by a sucking stream. Therefore the sucking device 116 can be changed to another device which has the same function. However when an electric fan is used, it is the best mode, because it is miniature and does not need an incidental equipment. Sucking device 116 includes frame 118 which is tube like in shape for guiding the stream and a miniature electric fan 120. The electric fan 120 has a structure where the fan part 124 is fixed on the drive shaft or output shaft of the motor 122. The frame of the electric fan 120 is fixed at the upper side of the frame 118. Therefore when the electric fan 120 is operated, a sucking gas stream is generated. The sucking stream flows upwards from lower opening 126.

Next the transporting device 130 is explained. The transporting device 130 has a function which is to transport a card or card like good 100 which is pulled by the sucking device 116 towards the lateral direction. The transporting device 130 includes a transporting roller 132 and a dispensing device 134. The transporting roller 132 has a function which is to transport a card or a card like good 100, which is pulled at lower opening 126 by sucking device 116, towards the lateral direction.

The shaft of the transporting roller 132 is attached at a frame 118, and the roller 132 is almost located in the frame 118. The surrounding surface of the transporting roller 132 slightly protrudes downwards from lower opening 126. The transporting roller 132 is for transporting the card or the card like good 100, which is pulled or suctioned by lower opening 126. Shaft 136 is connected to motor 138 through a reducer (not shown) and is rotatable into the clockwise direction or the counter clockwise direction. In other words, transporting roller 132 is selectively rotated into the transporting direction of the card or the card like good 100 or the returning direction.

The dispensing device 134 has a function where it receives the card or card like good 100 from transporting roller 132. Afterwards it transports the card or card like good 100 to a dispensing slot (not shown). The dispensing device 134 includes a driving roller 140 and a pressing roller 144 which is urged to the driving roller 140 by spring 142. The driving roller 140 and the pressing roller 144 are a pair of pinching rollers and are located beside the transporting roller 132. The driving roller 140 is rotated so as to be synchronized with the transporting roller 132, rotating in the same direction as the transporting roller 132 by motor 138 through a reducer (not shown). The driving roller 140 and the transporting roller 132 are the same diameter. When the card or the card like good 100 is transported by the rollers, the card or the card like good 100 is not damaged, because the card or the card like good 100 is transported at the same speed by the rollers.

The pressing roller 144 is located below driving roller 140. The pressing roller 144 is urged towards the driving roller 140 by a spring 142. When there are no cards or card like goods 100, the pressing roller 144 is in contact with the driving roller 140 at a predetermined force or is slightly spaced away from the driving roller 140. The transporting roller 132 and the driving roller 140 can be unified using a transmission belt. Also, the invention can be provided with an embodiment in which there is not a dispensing device 134.

Next, the duplicate detecting device 150 is explained. The duplicate detecting device 150 has the function of detecting the situation where more than two cards or card like goods 100 are transported from the transporting device 130. The duplicate detecting device 150 includes a guiding roller 151, a driven body 154 and a sensor 156. The guiding roller 151, the driven body 154 and the sensor 156 are located at a transporting passageway 152 of the card or the card like good 100 which is located between the transporting device 130 and the dispensing slot (not shown). The guiding roller 151 is attached on the fixing shaft and is rotatable. The driven body 154 is a roller 162 which is attached at the end of a L-lever 160 which is rotatable on a fixed shaft 158, and is located over a guiding roller 151. Therefore, the transporting passageway 152 is located between the guiding roller 151 and the roller 162.

There is an operating piece 164 at the other end of the L lever 160. The roller 162 is urged toward a contact direction with the guiding roller 151 based on the L lever 160 being urged by the spring 166. The operating piece 164 of another end of the lever 160 can be operatively connected to or positioned to face a sensor 156, which is fixed, to detect duplication. In other words, when the card or the card like good 100 is duplicated, the roller 162 is moved by the thickness of the card or the card like good 100 and the position of the operating piece 164 is sensed by sensor 156. Therefore when the roller 162 is moved, the operating piece 164 moves into the detecting area of the sensor 156, which results in the duplicated cards or card like goods being detected. When the lever 160, which pivots on fixed shaft 158, is used, the expanding mechanism for moving can be made up easily.

In other words, the thickness of the card or the card like good 100 is thinner. Therefore the moving quantity of roller 162 is smaller. When the small moving quantity is detected, the detecting device has to use a highly accurate sensor, as a result, the sensor is expensive. When the expanding mechanism is used, the moving quantity is larger, as a result the sensor can use a low-accuracy sensor. Therefore duplicate detecting device 150 can use a low-accuracy sensor which is inexpensive. However the duplicate detecting device 150 can use another type of sensor which detects such a duplicate of the card or the card like good 100.

Next the vibration device 170 is explained. The vibration device 170 has a function where the adhered card or card like goods 100 are separated by the vibration. The vibration device 170 in the embodiment includes a beating lever 174 and a solenoid 176. The beating lever 174 is pivotable on a fixed shaft 172 of a frame 118 and is pivoted by a solenoid 176. A pin (not shown) which protrudes in the lateral direction from the end of a plunger 178 of the solenoid 176 is inserted into an elongate hole (not shown) which is located at the beating lever 174.

The plunger 178 is always urged in the protruding direction by a spring 180. Accordingly the beating lever 174 is kept at a standby position which does not obstruct the movement of the card or the card like good 100. When the solenoid 176 is excited, the beating lever 174 pivots in the counter clockwise direction in FIG. 1, and it hits the uppermost card or card like good 100 on the table 102. Therefore the adhered card or card like good 100 receives the vibration by the hit, as a result, the cards or the card like goods 100 are separated. The vibrating device 170 can be changed to another device which can separate the adhered card or card like good 100, for example the card case 110 is vibrated and the card or the card like good 100 is vibrated.

Next, the position sensor 182 for the card or the card like good 100 is explained. The position sensor 182 has a function where the best position of uppermost card or card like good 100 on the table 102 relative to sucking device 116 is detected. A micro switch 184 is fixed at the frame 118, and the contactor 186 is located below the lower opening 126. The uppermost card or card like good 100 pushes up the contactor 186, then when the micro switch 184 is turned from OFF to ON, the distance between the lower opening 126 and the uppermost card or card like good 100 is the best or preferred distance. The position sensor 182 can be changed to another sensor which has the same function.

Next, separating device 188 is explained. The separating device 188 has the function in which when the duplicate detecting device 150 detects the duplication, the vibrating device 170, the moving device 114, the transporting device 130 and the sucking device 116 are operated as the adhered card or card like good 100 is separated. The separating control device of separating device 188 is for example a micro-processor. A passing sensor 190 is located at the transporting passageway 152 between the transporting roller 132 and the dispensing device 134. The passing sensor 190 has the function in which it detects and passes the card or the card like good 100. This sensor can also be changed to another device which has the same function. When the contactor is pushed up by the card or the card like good 100, the passing sensor 190 is turned from OFF to ON and when there are no cards or card like goods 100, the contactor is no longer pushed up therefore the passing sensor 190 continues in the OFF position.

Next, the operation is explained referring to the flow chart shown in FIG. 10. In step S1, when the dispensing indication signal is distinguished, the program goes to step S2. In step S2, the position sensor 182 is "ON", in other words, when contactor 186 is pushed up by the card or the card like good 100, the program goes to step S3, and the moving device 114 moves downwards, afterwards the program goes to step S4. In step S2, when the position sensor 182 is "OFF", the program goes to the after-mentioned step S6. In step S4, when the position sensor 182 is "OFF", in other words, when uppermost card or card like good 100 on the table 102 is away from the sucking device 116 at a predetermined distance, the program goes to step S5.

In step S5, the moving device 114 is stopped (the situation in FIG. 2), then the program goes to step S6. In step S6, the moving device 114 is operated, and the table 102 is moved upwards. Accordingly the card or the card like good 100 comes close to the sucking device 116. Next in step S7, when the position sensor 182 goes "ON", the program goes to step S8. In step S8, the moving device 114 is stopped (the situation in FIG. 3), then the program goes to step S9. In the process from step S2 to S8, the position of the uppermost good like card 100 is reset. In other words, the distance between the uppermost card or card like good 100 and lower opening 126 of sucking device 116 is adjusted in the desirable distance.

In step S9, the electric motor 122 is operated, and the fan 124 rotates, accordingly the air is sucked from the lower opening 126 of frame 118, and therefore a sucking stream flows upwards. By this, the uppermost card or card like good 100 is sucked by the sucking device 116, and the card or card like good 100 contacts the lower opening 126. In step S10, the moving device 114 is operated at a predetermined time, and the table 102 moves downwards. Therefore the card or the card like good 100 which is sucked by the sucking device 116 and the card or card like good 100 on the table 102 are spaced away at a distance (the situation in FIG. 4). By this downwards moving, card or card like good 100 on table 102 and sucked card or card like good 100 are separated to perfection. Therefore the duplicate card or card like goods are not dispensed. Also, when the card or card like good 100 is heavy, steps S9 and S10 have enough time for sucking the card or card like good 100. Therefore a timer step is inserted between step S9 and step S10.

In step S11, the motor 138 is operated. Accordingly the transporting device 130 transports the card or the card like good 100. In other words, the transporting roller 132 and the driving roller 140 rotate in the counter clockwise direction. Therefore the sucked card or card like good 100 which is pulled at the lower opening 126 and has contact with the transporting roller 132 is moved to the right direction in FIGS. 1 to 9. In the moving process of the card or the card like good 100 at the transporting passageway 152, the passing sensor 190 is pushed up by the card or the card like good 100, and the sensor 190 goes "ON". In step S12, when the "ON" signal is distinguished, the program goes to step S13. In step S13, the sucking device 116 and the transporting device 130 are stopped, then the program goes to step S14.

Figure 5:
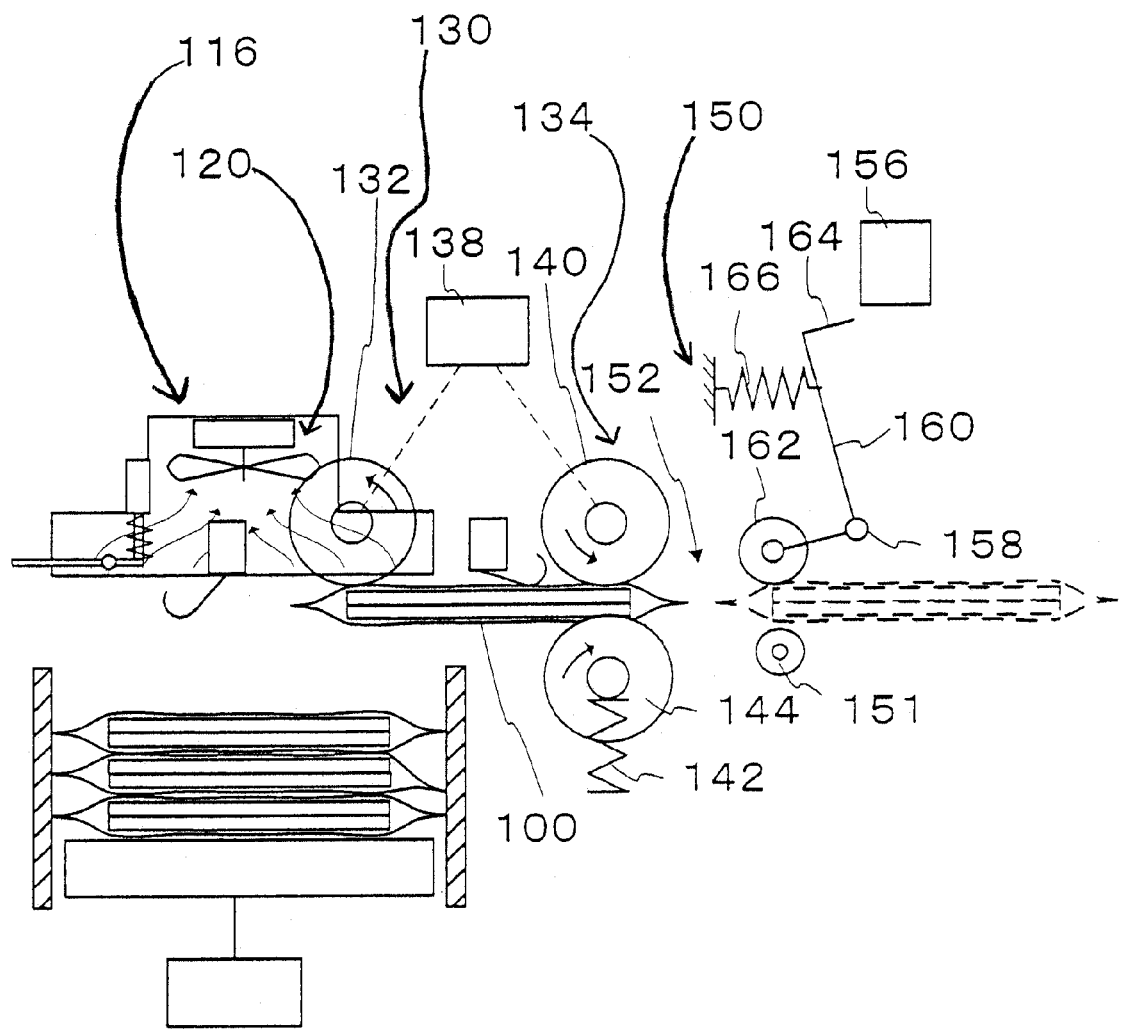
FIG. 5 is an explanatory schematic view of the automatic dispensing machine of the card or card like good of the embodiment according to FIG. 1.
Figure 6:
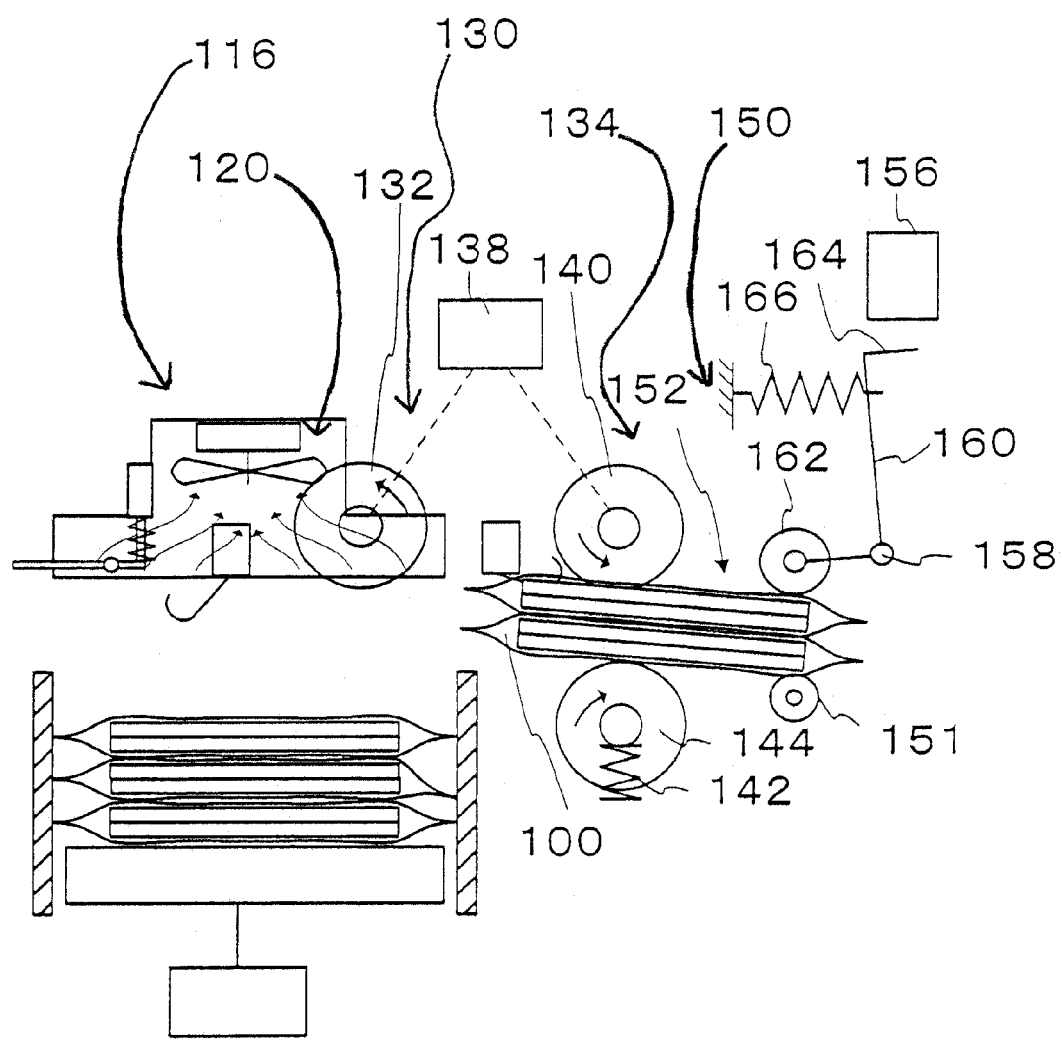
FIG. 6 is an explanatory schematic view of the automatic dispensing machine of the card or card like good of the embodiment according to FIG. 1.
Figure 7:
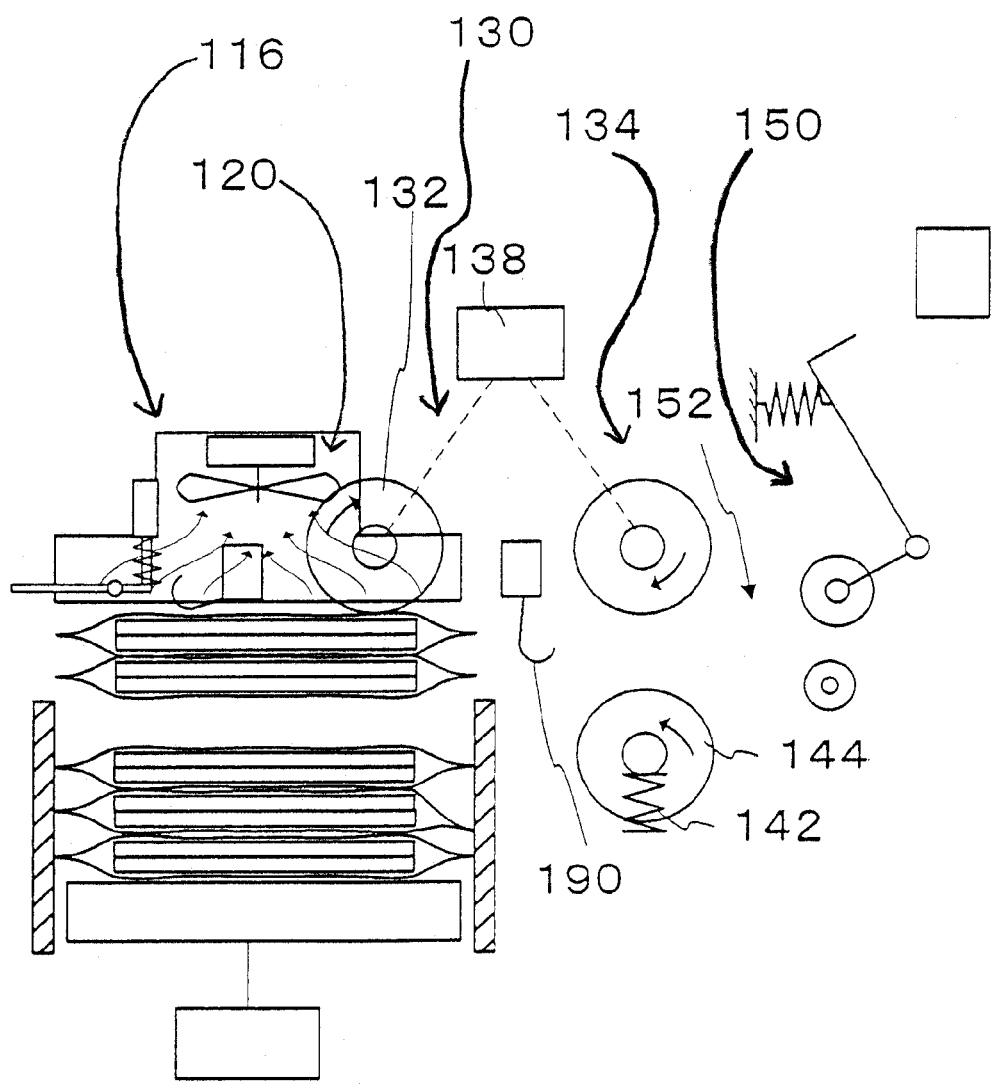
FIG. 7 is an explanatory schematic view of the automatic dispensing machine of the card or card like good of the embodiment according to FIG. 1.
Figure 8:
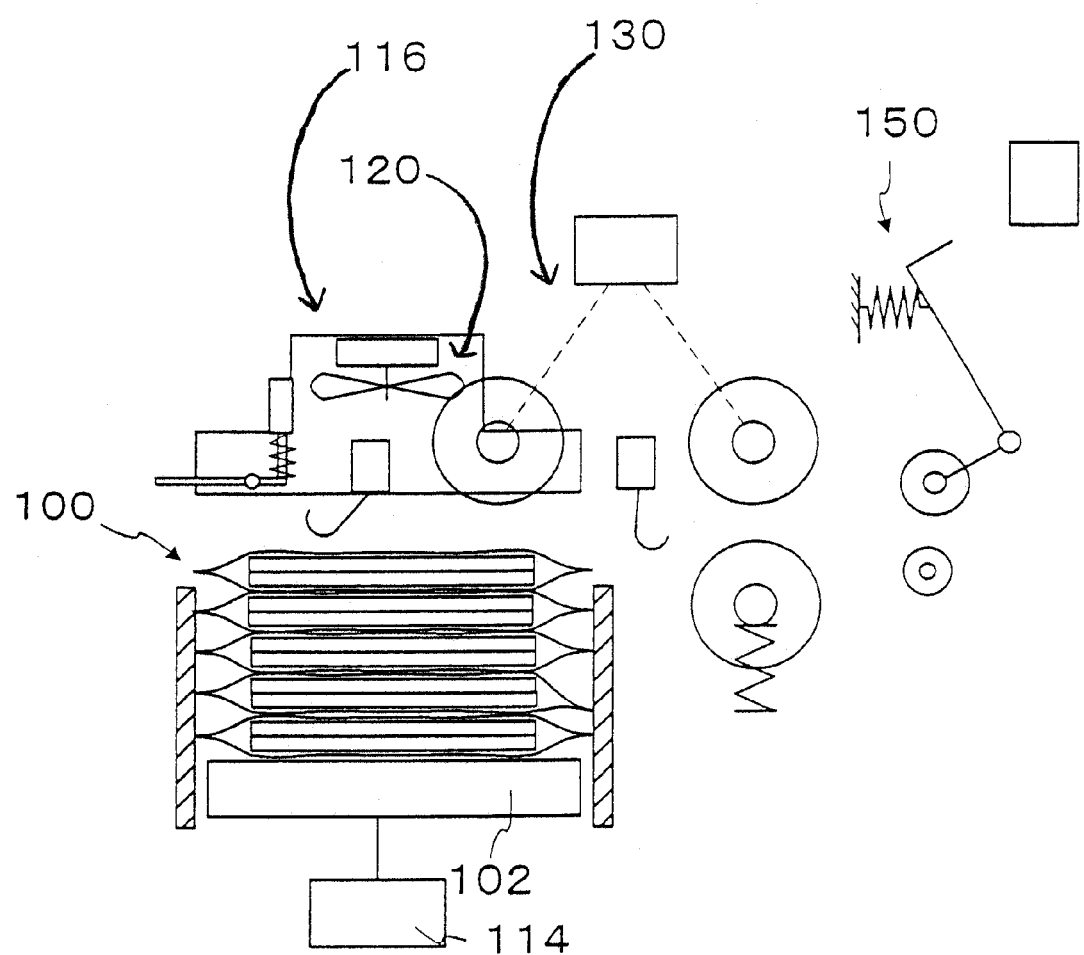
FIG. 8 is an explanatory schematic view of the automatic dispensing machine of the card or card like good of the embodiment according to FIG. 1.
Figure 9:
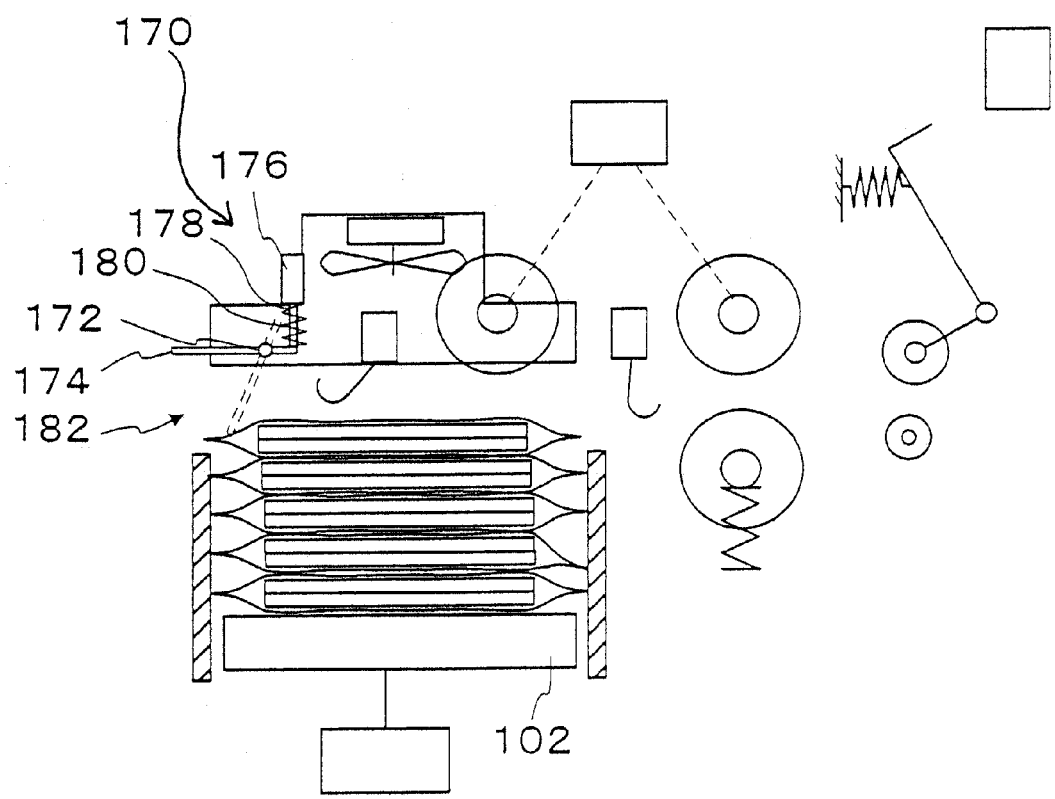
FIG. 9 is an explanatory schematic view of the automatic dispensing machine of the card or card like good of the embodiment according to FIG. 1.

In step S14, the program clocks a predetermined time, then the program goes to step S15. In step S13, when the transporting device 130 stops, the card or the card like good 100 is slightly moved by the inertia. The card or the card like good 100 stops in a situation which is pinched by the driving roller 140 and the pushing roller 144 (the situation which is shown in solid line in FIG. 5). When the situation shown in FIG. 5 is continued at a predetermined time in step S14, it prevents the dispensing of a next card or card like good 100. In other words, the dispensing of two cards or card like goods 100 is continually prevented. Next in step S15, the transporting device 130 is operated, the card or the card like good 100 is moved to the dispensing slot in the transporting passageway 152. In this process, the card or the card like good 100 arrives at duplicate detecting device 150.

In other words, the card or the card like good is pinched between the guiding roller 151 and the roller 162. When the card or the card like good 100 is only one in number, the L-lever 160 pivots at a small angle on the shaft 158. Therefore the operating piece 164 is not detected by the sensor 156. In other words, the duplicate detecting device 150 distinguishes a normal dispensing. In step S16, the duplicate signal is not distinguished, the program goes to step S17. In step S17, when the passing sensor 190 is "OFF", in other words, when the card or the card like good 100 passes through the passing sensor 190, the program goes to step S18. In step S18, transporting device 130 is stopped, and the dispensing process finishes. Therefore the card or the card like good 100 stops at a situation which is projected from the dispensing slot.

When duplicate cards or card like goods 100 are dispensed, the roller 162 of the duplicate detecting device 150 is pivoted by a larger degree in the clockwise direction. Therefore the operating piece 164 is moved into the detecting area of the sensor 156 (shown in FIG. 6). By this, the sensor 156 provides a duplicate signal output, and the program goes to step S16 to S19. In step S19, the transporting device 130 is stopped, afterwards the program goes to step S20. In step S20, the transporting device 130 transports the card or the card like good 100 in the opposite direction. Afterwards, the sucking device 116 is operated. In other words, the transporting roller 130 and the driving roller 140 are rotated in the clockwise direction. Therefore the card or the card like good 100 is transported to the left direction, and the returned card or the card like good 100 is pulled by the sucking device 116.

In step S21, a predetermined time is clocked. By this, the returned cycle is executed at a predetermined time. Accordingly the card or the card like good 100 is returned onto the table 102 at the storing section 112. In this case, the rear end 108 of the card or the card like good 100 is stopped by a section of the card case 110, and it is kept at the storing section 112. Next in step S22, the transporting device 130 and the sucking device 116 are stopped, and the card or the card like good 100 is given free access from the sucking device 116. Therefore, the adhered card or the card like good 100 falls down onto the table 102.

Next in step S23, moving device 114 is operated, the table 102 is moved upwards. Therefore the position sensor 182 is pushed up by the uppermost card or card like good 100. In step S24, when the position sensor 182 distinguishes "ON", the program goes to step S25. In step S25, the moving device 114 is stopped. In other words, the uppermost card or card like good 100 is moved near the vibration unit 170. Next in step S26, the solenoid 176 is turned "ON" or "OFF" at a predetermined time. By this, the beating lever 174 hits the uppermost card or the card like good 100 on the table 102 at a predetermined time. The card or the card like goods 100 receive a vibration. Therefore the adhered cards or card like goods 100 are separated. Next, the program returns to step S2, then uppermost card or card like good is pulled by the sucking device 116 again as the above-mentioned, afterwards the card or card like good 100 is dispensed by the transporting device 130.

Also, the process from step S19 to step can be executed plural times. In this case, the adhered card or card like good 100 receives many hits from the vibrating lever 174, therefore the adhered card or card like good gets fully separated. Also, when dispensing device 134 is structured by a pair of rollers which pinches the card or the card like good 100, the adhered section receives the power to remove and separate the card or card like good. Therefore the adhered card or card like goods 100 is separated more.

While specific embodiments of the invention have been shown and described in detail to illustrate the application of the principles of the invention, it will be understood that the invention may be embodied otherwise without departing from such principles.

What is claimed is:

1. An automatic dispensing machine for dispensing cards or card like goods, the machine comprising:
   a table which supports piled up cards or card like goods;

a sucking device located over said table to pull a card or card like good;

a transporting device transporting the card or card like good which is pulled by the sucking device;

a moving device affecting a change in a distance between said table and said sucking device;

a duplicate detecting device located at a card transporting passageway located downstream of said transporting device;

a vibrator which imparts a vibration to the card or the card like good on the table; and a separating device for receiving an indication from said duplicate detecting device upon the detection of a duplicate of the card or card like goods, the separating device reversing said transporting device to return the card or card like goods to the table and subsequently stopping said sucking device and actuating said vibrator to vibrate.

2. An automatic dispensing machine as claimed in claim 1, wherein said transporting device includes a pair of pinching rollers located between said sucking device and said duplicate detecting device.

3. An automatic card or card like good dispensing method comprises the steps of:

pulling a card or card like good from piled up cards or card like goods on a table using a sucking device;

transporting the pulled card or card like good using a transporting device;

detecting a duplicated card or card like good using a duplicate detecting device during transporting;

returning the cards or card like goods to a position located over the table using the transporting device based on a detected duplicate card or card like good;

and subsequently stopping the sucking device and vibrating the cards or card like goods on the table using a vibrating device;

subsequently pulling a card or card like good from piled up cards or card like goods on a table using the sucking device and transporting the pulled card or card like good using a transporting device.

4. A card or card like good automatic dispensing machine, the machine comprising:

a support for a stack of cards or card like goods;

a sucking device located over said support to pull a card or card like good by suction;

a transporting device transporting the card or card like good which is pulled by the sucking device;

a moving device for adjusting a distance between said support and said sucking device;

a duplicate detecting device located along a path of said transporting device;

a vibrator which imparts a vibration to the stack of cards or card like goods;

a control device for receiving an indication from said duplicate detecting device upon the detection of a duplicate of the card or card like goods of said transporting device, said control device reversing said transporting device to return the cards or card like goods to the support and subsequently stopping said sucking device and actuating said vibrator to vibrate the cards or card like goods.

5. An automatic dispensing machine as claimed in claim 4, wherein said transporting device includes a pair of pinching rollers located between said sucking device and said duplicate detecting device.

* * * * *